United States Patent
Brown et al.

(10) Patent No.: US 10,055,385 B2
(45) Date of Patent: Aug. 21, 2018

(54) VISUAL PREVIEW BASED ON ANALYTICAL METADATA

(71) Applicant: SAP SE, Walldorf (DE)

(72) Inventors: Andrew Brown, Paris (FR); Louis Rakotoarivony, Verrieres le Buisson (FR); Alexandre Fortin, Paris (FR)

(73) Assignee: Business Objects Software Limited, Dublin (IE)

(*) Notice: Subject to any disclaimer, the term of this patent is extended or adjusted under 35 U.S.C. 154(b) by 21 days.

(21) Appl. No.: 15/299,765

(22) Filed: Oct. 21, 2016

(65) Prior Publication Data

US 2018/0113843 A1    Apr. 26, 2018

(51) Int. Cl.
| | | |
|---|---|---|
| *G06F 17/00* | (2006.01) | |
| *G06F 17/21* | (2006.01) | |
| *G06F 17/30* | (2006.01) | |
| *G06F 17/24* | (2006.01) | |
| G06F 3/0484 | (2013.01) | |

(52) U.S. Cl.
CPC .......... *G06F 17/212* (2013.01); *G06F 17/24* (2013.01); *G06F 17/246* (2013.01); *G06F 17/30368* (2013.01); *G06F 17/30377* (2013.01); *G06F 3/04847* (2013.01)

(58) Field of Classification Search
CPC ... G06F 17/212; G06F 17/245; G06F 17/2785
See application file for complete search history.

(56) References Cited

U.S. PATENT DOCUMENTS

| | | | | |
|---|---|---|---|---|
| 6,581,068 B1* | 6/2003 | Bensoussan | ...... | G06F 17/30457 |
| 7,356,779 B2* | 4/2008 | Cras | .................. | G06F 17/30395 |
| | | | | 707/999.102 |
| 7,505,038 B2* | 3/2009 | Bell | ........................ | G06T 11/20 |
| | | | | 345/419 |
| 8,713,467 B1* | 4/2014 | Goldenberg | .......... | G06F 3/0481 |
| | | | | 715/716 |
| 8,819,571 B2* | 8/2014 | Robert | ................ | G06F 3/04817 |
| | | | | 715/769 |

(Continued)

OTHER PUBLICATIONS

Schuler et al., "Data Centric Discovery with a Data-Oriented Architecture," SCREAM'15, Jun. 16 2015, Portland, OR, USA © 2015 ACM, p. 37-44.*

*Primary Examiner* — Amelia Tapp
(74) *Attorney, Agent, or Firm* — Buckley, Maschoff & Talwalkar LLC

(57) ABSTRACT

Provided are a system and method for generating a preview of master data based on metadata thereof. In one example, a method includes receiving a data file including at least one table, identifying master data included in the at least one table of the data file and identifying metadata of the master data, auto-generating a visual preview of a measure of the master data based on metadata of the measure, and outputting, to a user interface, the visual preview of the measure and metadata values of the measure that are associated with the visual preview and which are capable of being changed via the user interface. The example embodiments allow a user to modify metadata associated with master data and provide a visual preview of the master data based on the changed metadata thereby giving the user instant validation of the change without requiring administrative (IT) assistance.

18 Claims, 16 Drawing Sheets

(56) References Cited

U.S. PATENT DOCUMENTS

| | | | | |
|---|---|---|---|---|
| 9,015,073 B2* | 4/2015 | Mirra | .................... | G06Q 40/06 |
| | | | | 705/35 |
| 9,727,550 B2* | 8/2017 | He | ........................ | G06F 17/246 |
| 2008/0228697 A1* | 9/2008 | Adya | ................ | G06F 17/30595 |
| 2012/0030277 A1* | 2/2012 | Pawlowski | ....... | G06F 17/30011 |
| | | | | 709/203 |

* cited by examiner

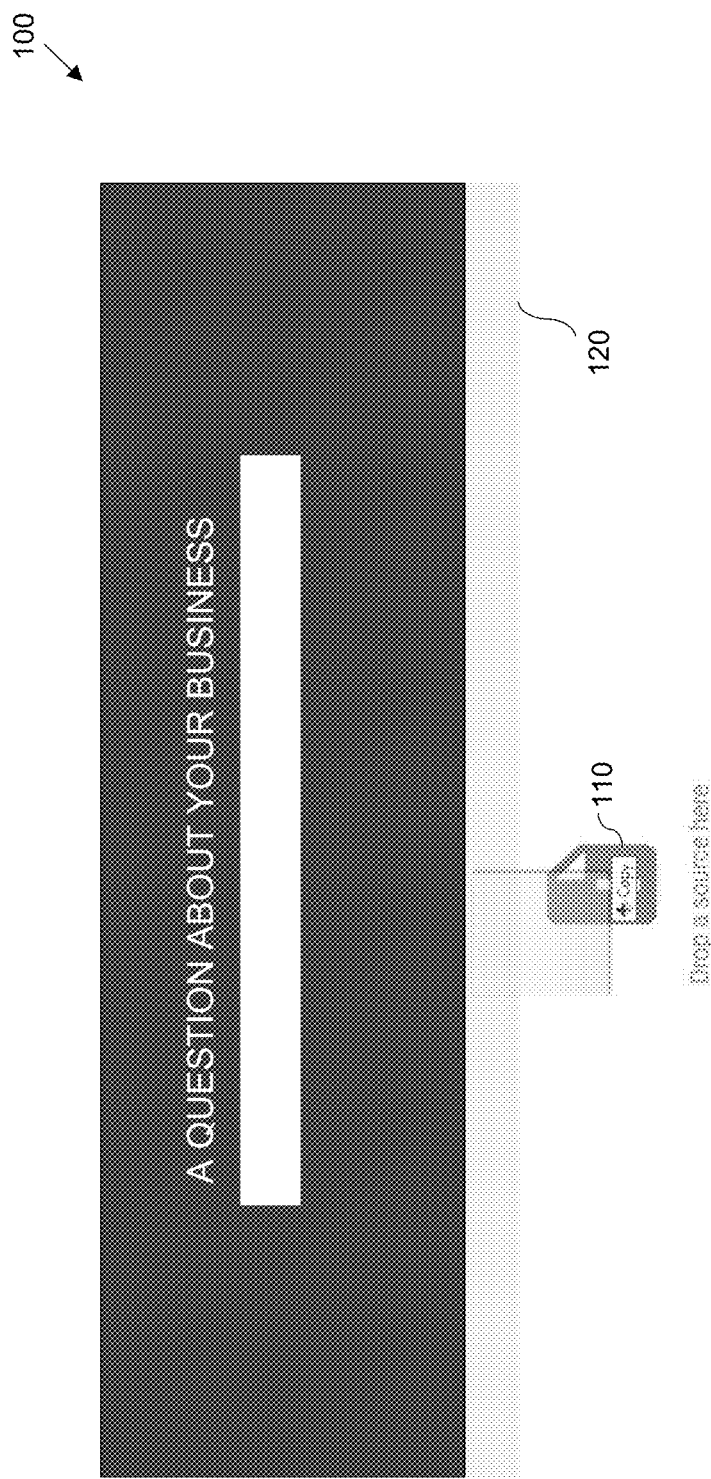

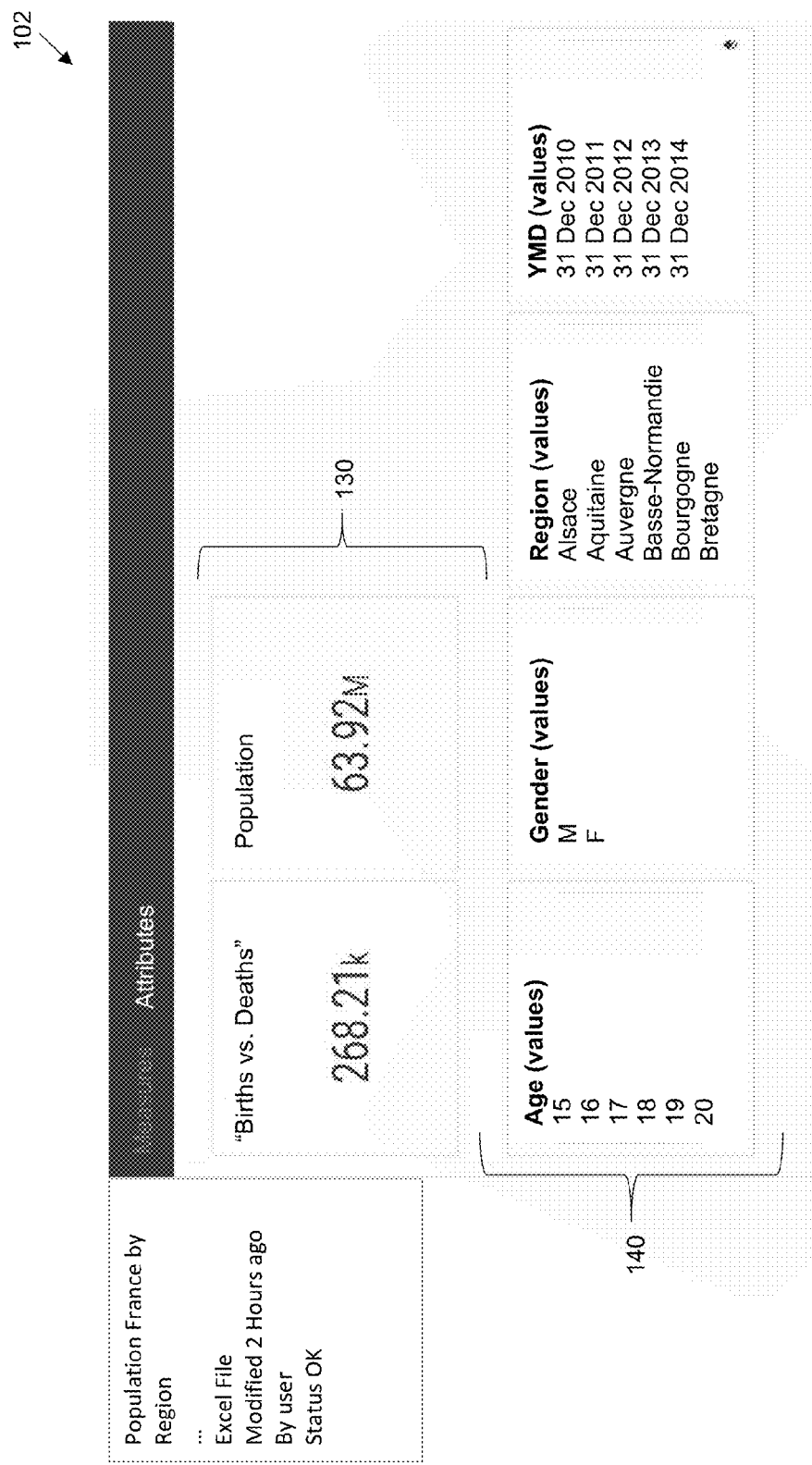

VISUAL PREVIEW BASED ON ANALYTICAL METADATA

BACKGROUND

Data visualization helps viewers better understand the significance of data by placing it in visual context. For example, patterns, trends and correlations that might go undetected from text-based data analysis can be exposed and more easily recognized through data visualization. Data visualization also provides analytics more easily allowing viewers to grasp difficult concepts or identify new patterns relatively quickly and without laborious computation. Furthermore, with interactive visualizations, a user may "drill down" into the data (e.g., charts and graphs) and view additional detail, thereby interactively changing the displayed data and the processing thereof. Data visualization tools go beyond the standard charts and graphs used in spreadsheets by displaying data in more sophisticated ways such as infographics, dials and gauges, geographic maps, heat maps, and detailed bar, pie and fever charts. As will be appreciated, visualizations of data can take many forms across many areas, and may be more useful in different forms to different organizations.

However, the only tools that allow for the creation of customized visualizations require significant amounts of programming. Furthermore, in order to modify a visualization of master data based on its corresponding metadata, an information technology (IT) expert or other administrator must adjust code and/or programming associated with the metadata. In addition, metadata is typically displayed using one of several techniques, for example, column based metadata with a short data preview, a query panel, and more recently through facets. However, none of these techniques provide instant visual validation on how metadata should behave from a semantic standpoint such as whether data is an attribute or a measure, an aggregation method of a measure, formatting, and the like. Additionally, users want to see the underlying master data and be able to perform common visual validation without requiring the IT department.

BRIEF DESCRIPTION OF THE DRAWINGS

Features and advantages of the example embodiments, and the manner in which the same are accomplished, will become more readily apparent with reference to the following detailed description taken in conjunction with the accompanying drawings, in which:

FIGS. 1A-1C are diagrams illustrating a process of generating a visual preview in accordance with example embodiments.

Figure 1B:
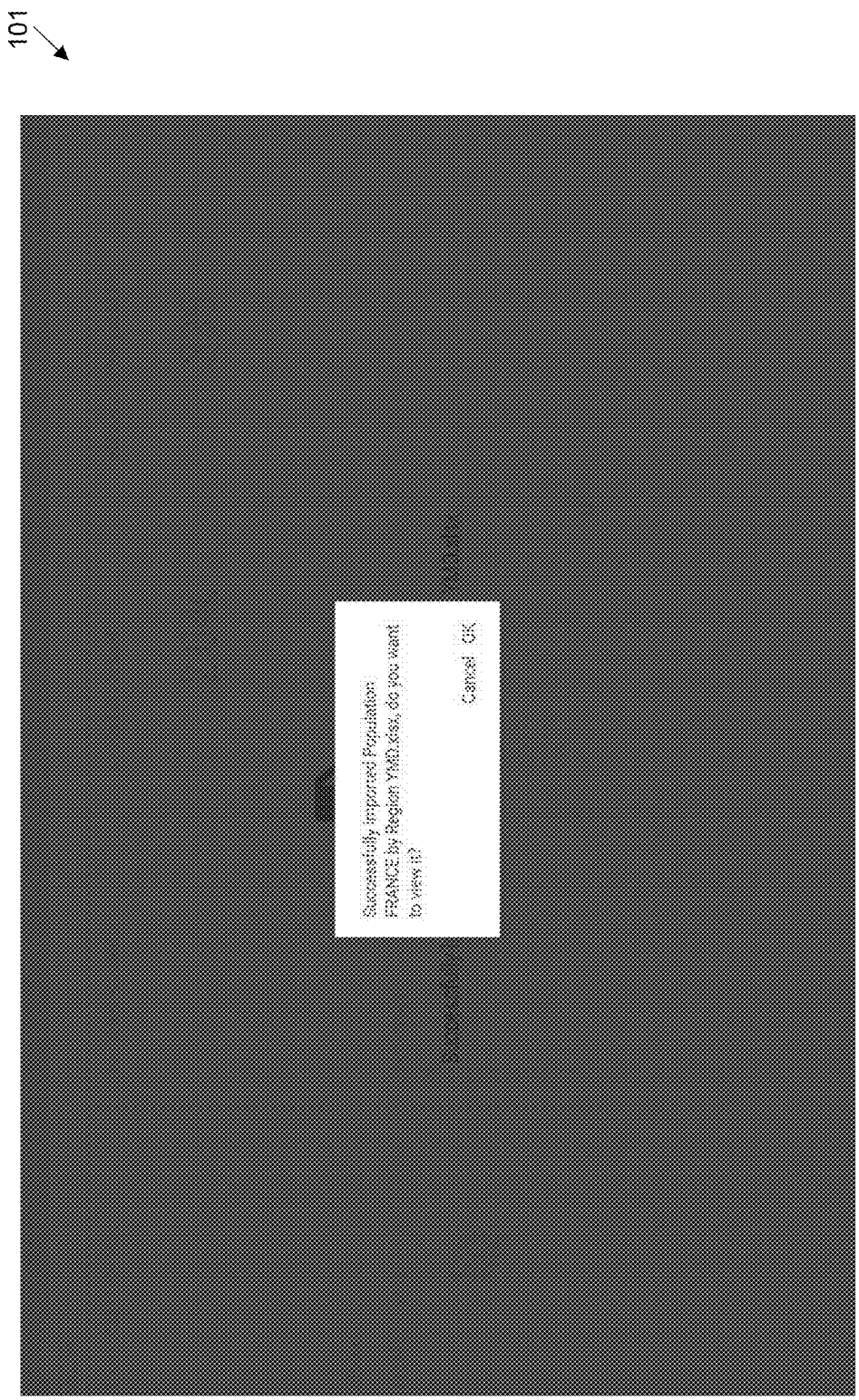

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

According to various embodiments, provided herein is a system and method for generating a visual preview of master data based on metadata associated therewith. The system may receive a data file such as a spreadsheet, a document, and the like, and extract master data from the data file. For example, the master data may be detected based on headers, columns, rows, or other features included in a received file. The master data may be combined, aggregated (in the case of numeric data), summarized, and the like to generate master day measures, attributes, values, and the like. The system may further identify metadata associated with the master data and that further describes the master data. Next, the system may generate a visual preview of the master data and display the visual preview along with one or more metadata values that may be changed in order to modify the visual preview. For example, a user may change a metadata value via a user interface and the system may automatically change the visual preview in response. As a result, a visualization of master data may be previewed and manipulated by manipulating metadata associated with the visualization of master data without the need for the master data to be visually changed by an administrator or an IT specialist familiar with the system.

The example embodiments provide, to a user, a visual solution for viewing and editing metadata within the user interface application. By providing simplistic master data previews (e.g., in the form of an attribute or a measure) users can quickly decide what needs to be changed semantically. In addition, edits performed by the user are immediate (no need for "validation" UI buttons such as OK, Apply, or Cancel) and the master data previews update for instant validation. Visual feedback displayed during updates allow a user to see progress and if any failure occurred. Furthermore, these edits may be immediately consumable in the rest of the interface of the system.

As merely an example, master data may refer to data that is created centrally and that is valid for a plurality of applications. For example, the master data may include geographical data, population data, business data, informative data, and the like. The master data may remain constant over time or be updated at intervals, for example, periodic, regular, occasional, and the like. As another example, master data may include basic data (base unit of measure, weight), purchasing data (over tolerance and under tolerance), accounting data (standard price, moving price), additional information such as a short description about material, currency, etc., and the like.

In some examples, the master data may include business data that is stored in disparate systems across an enterprise. The business data may include parties that conduct business with the enterprise, including customers, prospects, suppliers, and partners, products/services that the enterprise sells, places and how they are segmented, such as geographies, locations, subsidiaries, sites, and zones, reporting and accounting categories, including organization structures, sales territories, chart of accounts, cost centers, business units, profit centers, and price lists, reference data that is shared by and used across different internal and external systems and used to give meaning to data, transactional data that describes business events and is responsible for generating volumes of data in the enterprise and may reside in a CRM system, an ERP system, a SCM system, or other systems, log data that records events or takes snapshots of process states at moments in time, big data such as sensor data, machine data, and change-in-state data, and the like.

Metadata that is associated with the master data may refer to data that further describes the master data. For example, metadata may be an underlying definition or description of the master data. Metadata may include elements of the master data or elements for analyzing the master data. For example, metadata values may be used to itemize, group, describe, aggregate, summarize, modify, adjust, change, or otherwise manipulate master data. Also, master data, reference data, log data, and other types of data, may each have related or even the same metadata. According to various embodiments, metadata may have values that are capable of being adjusted by a user via a user interface and be used to modify a displayed preview of master data. For example, a visual preview of master data may be a temperature on a given day. A metadata value thereof may be a selection of whether the temperature is represented in unit degrees of Fahrenheit, Celsius, or Kelvin. In this example, a user may choose which metadata value (i.e., unit) to use to represent the temperature of the master data. In response, the user interface may generate a visual preview of master data having a numeric value of the temperature at that chosen unit metadata value for unit.

FIGS. 1A through 1C illustrate a process of generating a visual preview in accordance with example embodiments. Referring to FIG. 1A, a user interface based application may be executed by a computing device and a user interface 100 corresponding thereto may be displayed on a display screen of a user device such as a computer, a laptop, a tablet, a mobile device, an appliance, a television, a smart wearable device, a kiosk, and the like, or on a display device external to the computing device. The user interface 100 includes a search bar for receiving user input. In the example of FIG. 1A, an icon 110 corresponding to a data file which is may be stored locally on the respective computing device or externally may be shown in a background screen of a window of the user interface. The user may select the icon 110 and drag and drop the icon 110 via the user interface 100 at a predetermined position or area on the screen. In response, the user interface application may detect that the user wishes to view a preview of master data included in the data file corresponding to the icon 110.

In FIG. 1B, the user interface application imports data from the corresponding data file into the user interface application (e.g., from a local storage device or an external storage device) and displays an import successful screen 101 indicating that master data from the data file has been imported into the running application. In response to receiving an indication that a user of the user interface would like to view master data associated with the imported data file, the user interface application identifies master data included in the at least one table of the data file and also identifies metadata associated with the master data. The user interface application auto-generates a visual preview 102 of the master data based on metadata associated with the master data, and outputs the visual preview 102 in FIG. 1C. In this example, the user interface displays two measures 130 of the master data (i.e., Births v. Deaths, and Population) and also displays four attributes 140 of the master data (i.e., Age, Gender, Geographical Region, and Year/Month/Day 'YMD'). In the figures, it should be noted that the format of the date may be illustrated as Day/Month/Year (DMY) or YMD, interchangeably, and it should be understood that these terms both refer to the same thing (i.e., a date). In addition, a measure may refer to a numerical value generated from performing an operation or a calculation on master data values and an attribute may refer to a description, a feature, references, and the like, of master data. Also, an attribute may be a measure, and vice versa. The visual preview shown in FIG. 1C may be referred to as an example of an initial preview screen.

Figure 2A:
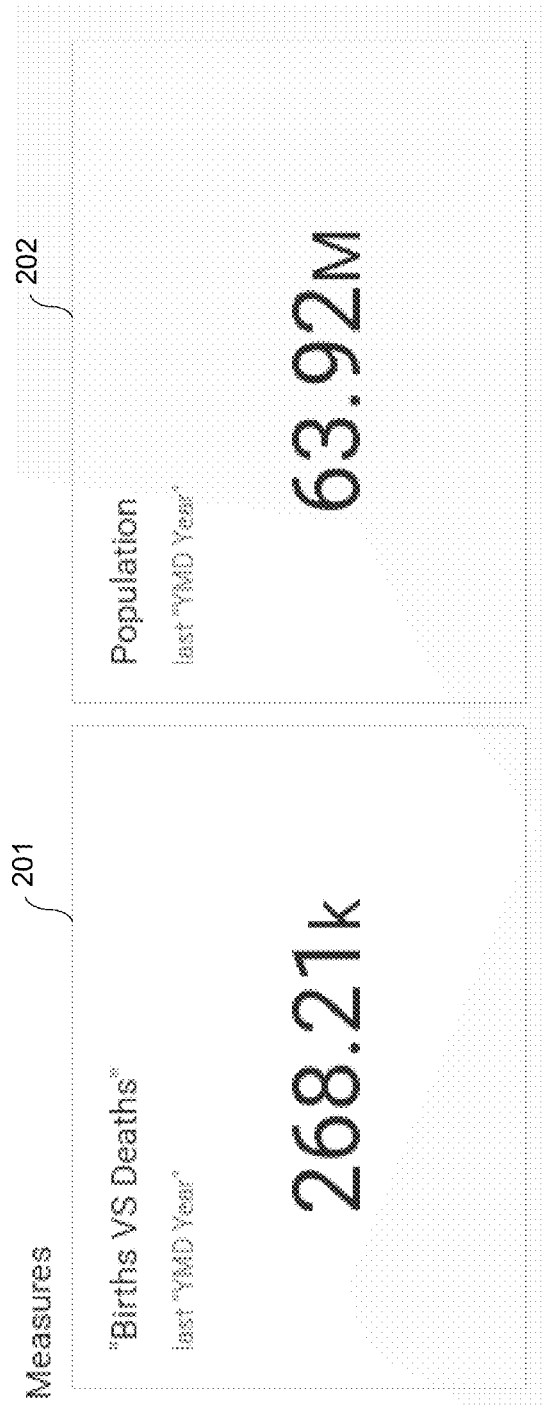
FIGS. 2A-2D are diagrams illustrating a process of modifying metadata associated with a measure of master data in accordance with example embodiments.

FIGS. 2A through 2D illustrate a process of modifying metadata associated with a measure of master data in accordance with example embodiments. Referring to FIG. 2A, the measures of master data from the user interface displayed in the visual preview 102 of FIG. 1C, are shown. As an example, a measure may be a summarization of values from the master data (e.g., revenue, quantity, inventory, population, etc.). In this example, the user interface displays a visual preview of a first measure 201 which is a comparison of Births versus Deaths during a period of time, and a visual preview of a second measure 202 is a measure of Population for a particular region at a point in time. In both instances, the visual preview includes a numeric value (i.e., 268.21 k and 63.92M).

Figure 2B:
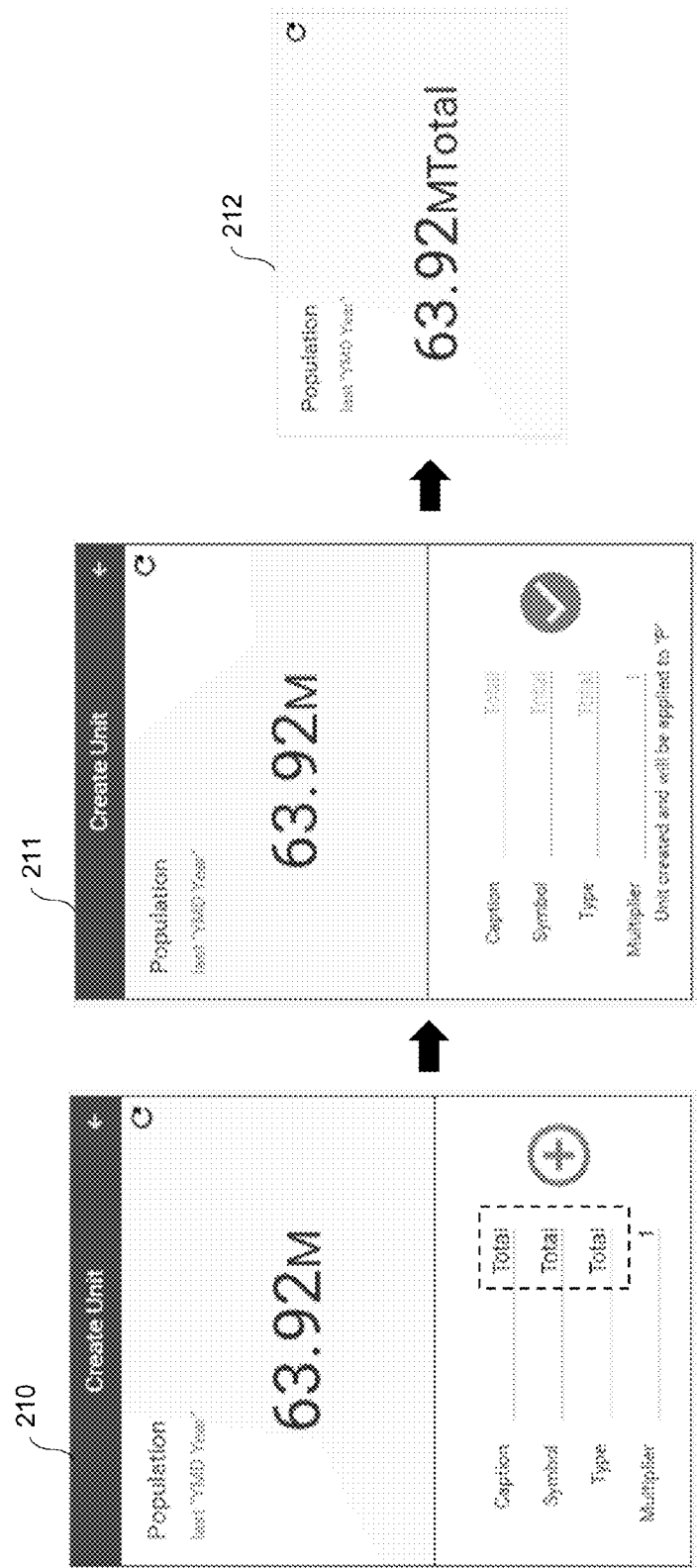

FIG. 2B illustrates metadata values on a user interface screen 210 that are associated with a Population measure extracted and determined from the master data. The metadata values include Caption, Symbol, Type, and Multiplier. In this example, the metadata values of the Population measure are initially set as null or some other setting. A user may enter a value for units into various metadata fields (i.e., Caption, Symbol, and Type). In this example, the user may type in a value in as free form text to input the word "Total" into the metadata fields for Caption, Symbol, and Type. In other words, the user changes the initial value of null into a modified value of "Total" via a key input. As another example, the input may be a selection from a drop down menu, a query bar, a radio button, and the like. A user may confirm the input text by selecting the plus sign on the right side of the user interface in 210, and in response, the application generates user interface screen 211 including a checkmark indicating that the units have been changed and next generates user interface screen 212 illustrating the change of the Caption from null to Total thereby changing "Population" into a "Total Population."

Figure 2C:
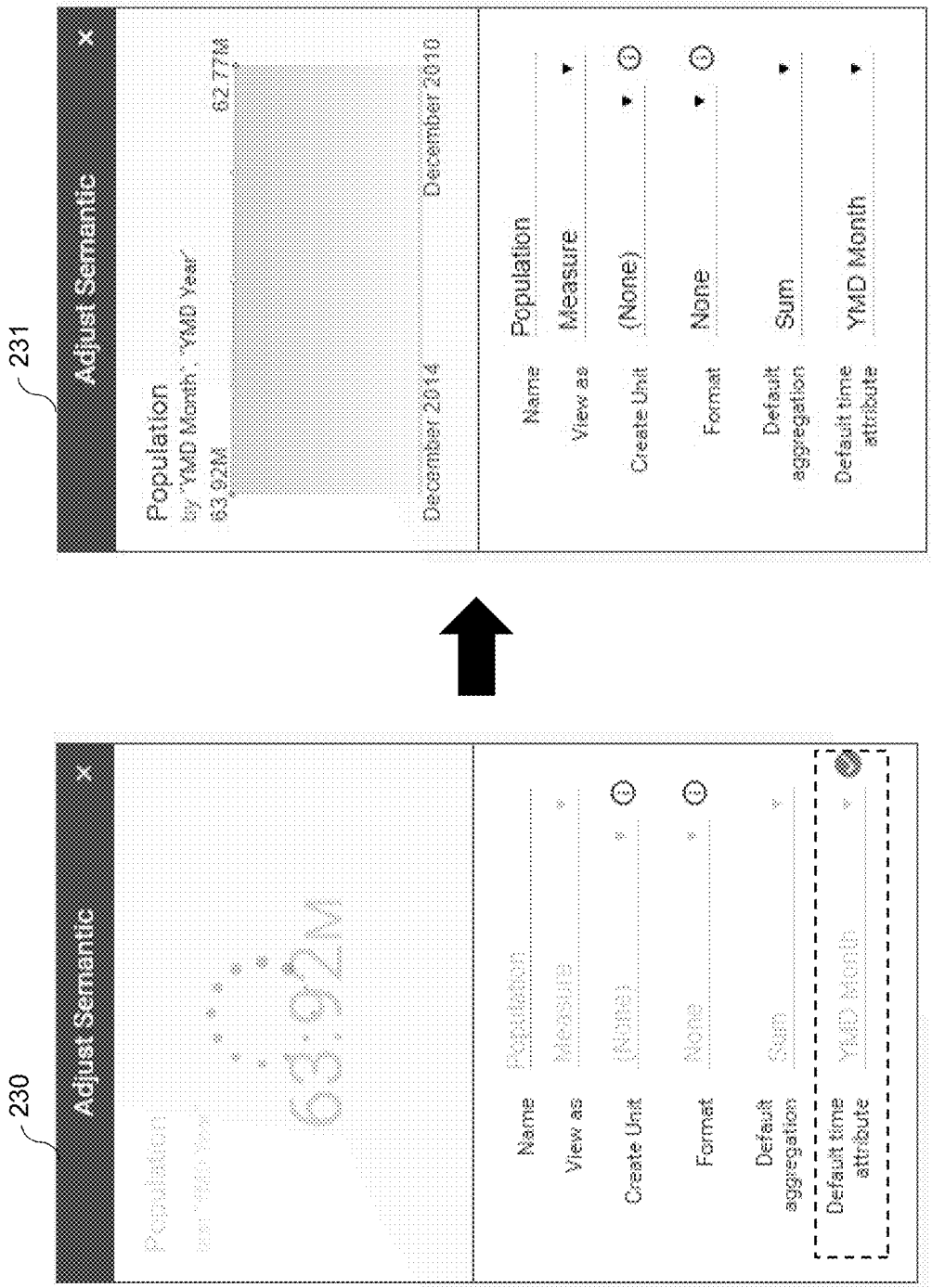
Figure 2D:
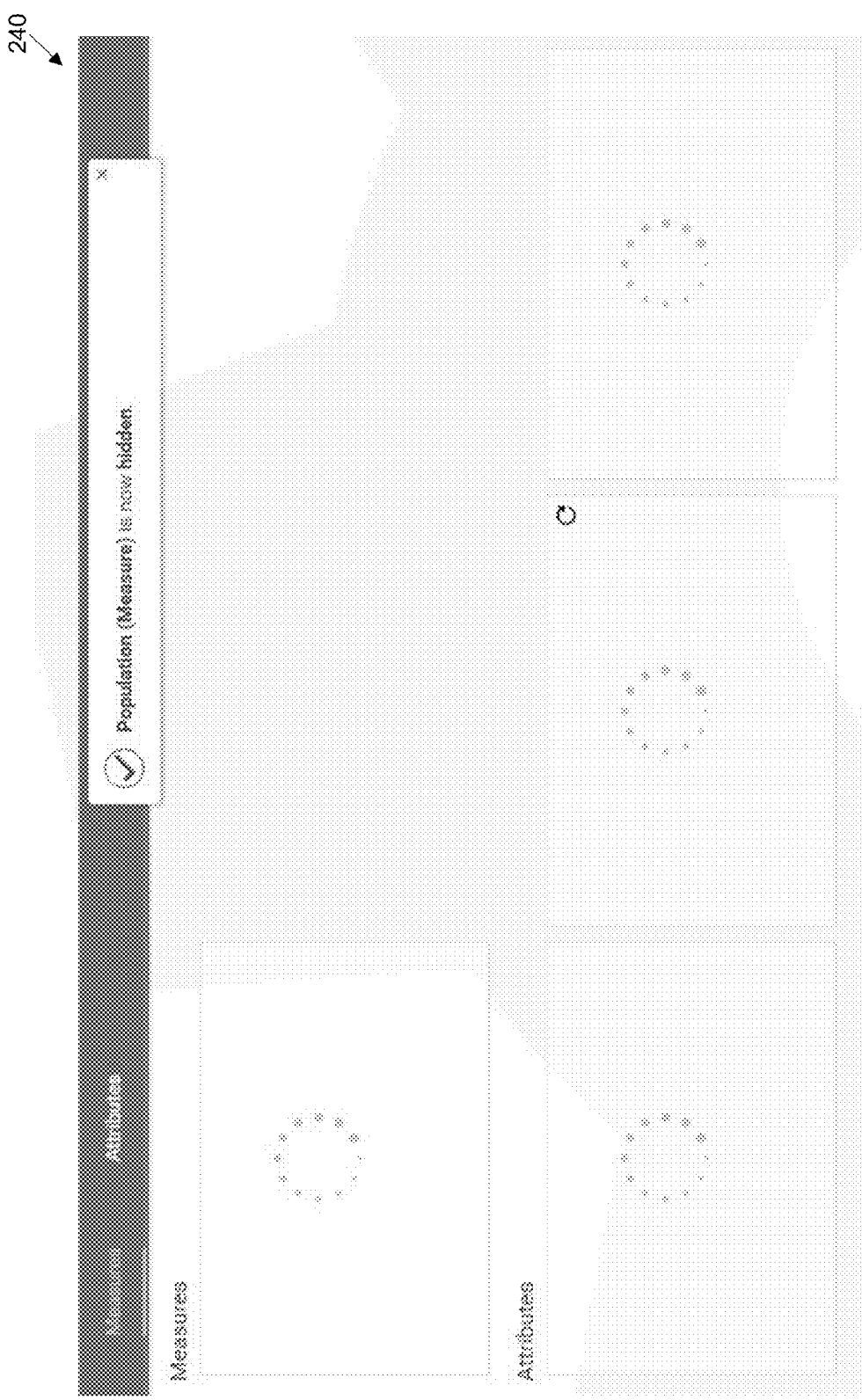

In FIG. 2C, visual preview of the Population measure is in the form of a numerical value. Here, the user adjusts a period of time value (i.e., metadata value) from a default value of yearly to a modified value of monthly and yearly via user interface 230. In response, rather than show the population as a single numerical value, the user interface application generates and displays a visual preview in user interface 231 of the Population measure on a time graph illustrating how the population changes over time on a monthly basis. As yet another example, as shown in FIG. 2D, a user may hide the visual preview all together by selecting a "hidden" option via the user interface as shown in user interface screen 240.

Figure 3A:
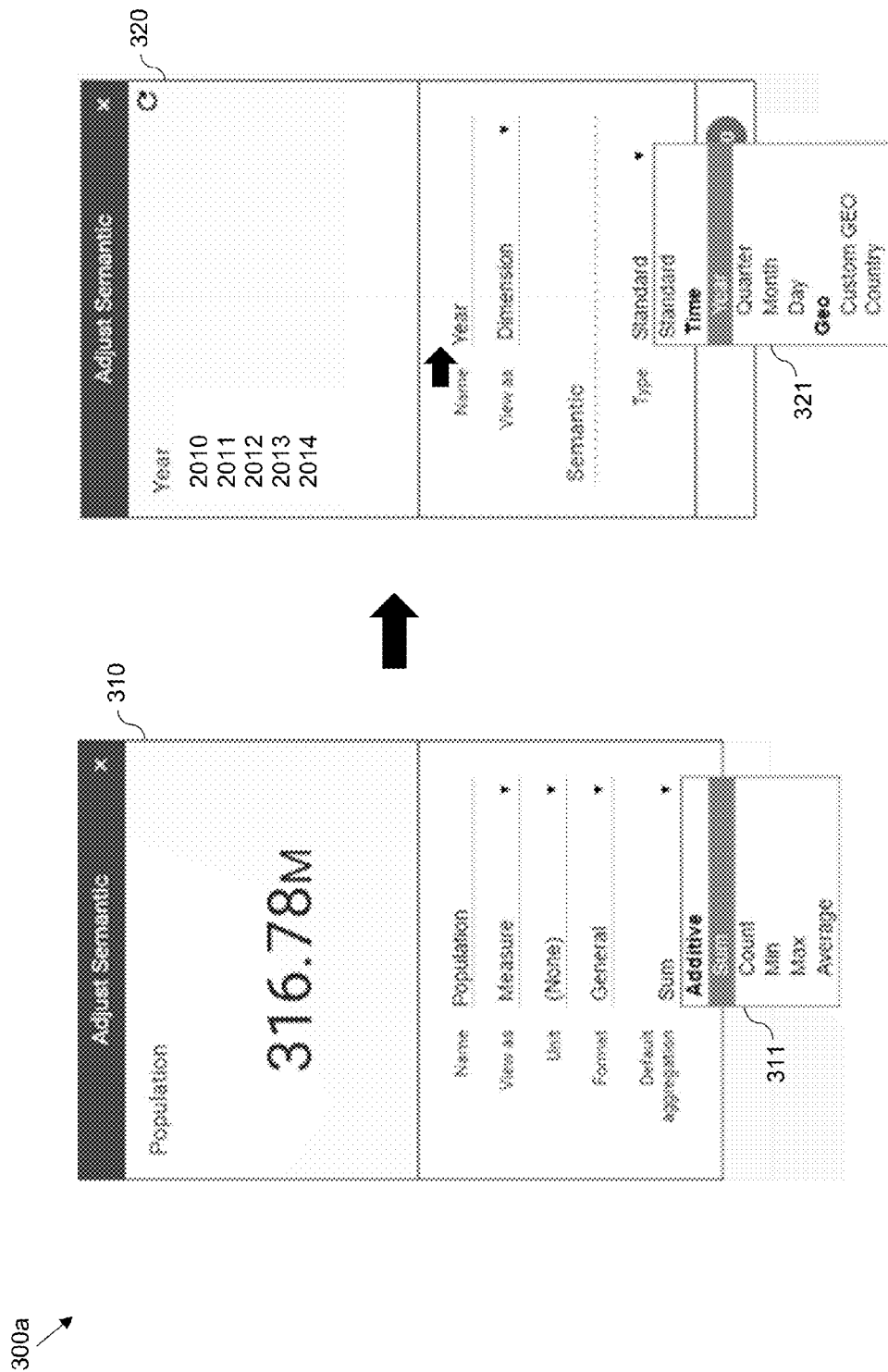
FIGS. 3A and 3B are diagrams illustrating a process of modifying an aggregation attribute of a measure to semi-additive in accordance with an example embodiment.
Figure 3B:
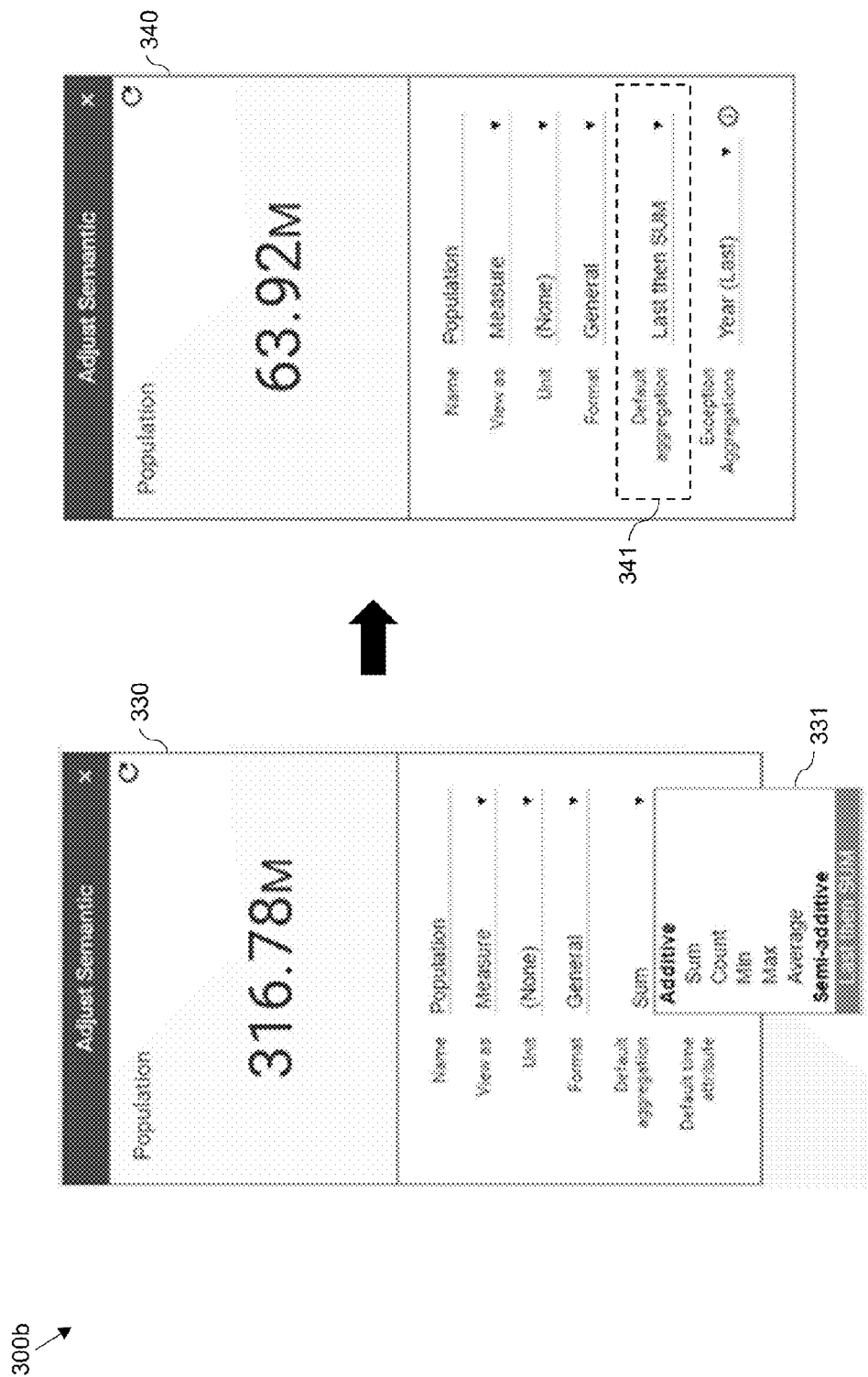

FIGS. 3A-3B illustrate a process 300a-300b of modifying an aggregation attribute of a measure to semi-additive in accordance with an example embodiment. Semi-additive measures can be summed across some dimensions, but not all, for example, "population" and "inventory" are common semi-additive measures because they are additive across all dimensions except time. In the example of FIG. 3, in 310 a measure for "Population" has a standard aggregation type of SUM therefore the measure will sum the population of all years in the dataset (e.g., 2010-2014). In this example, the attribute "Year" can have its semantic changed from Standard to Time=>Year in 320. In this example, the system detects the Time attribute and proposes to the user that Population can now be changed to semi-additive, in 330. The user selects Semi-Additive=>Last then SUM in 330, and the system changes the semantic and uses the newly defined time attribute for the semi-aggregation of the population measure, in 340. Therefore, the measure only sums the population of the last year in the dataset.

Figure 4:
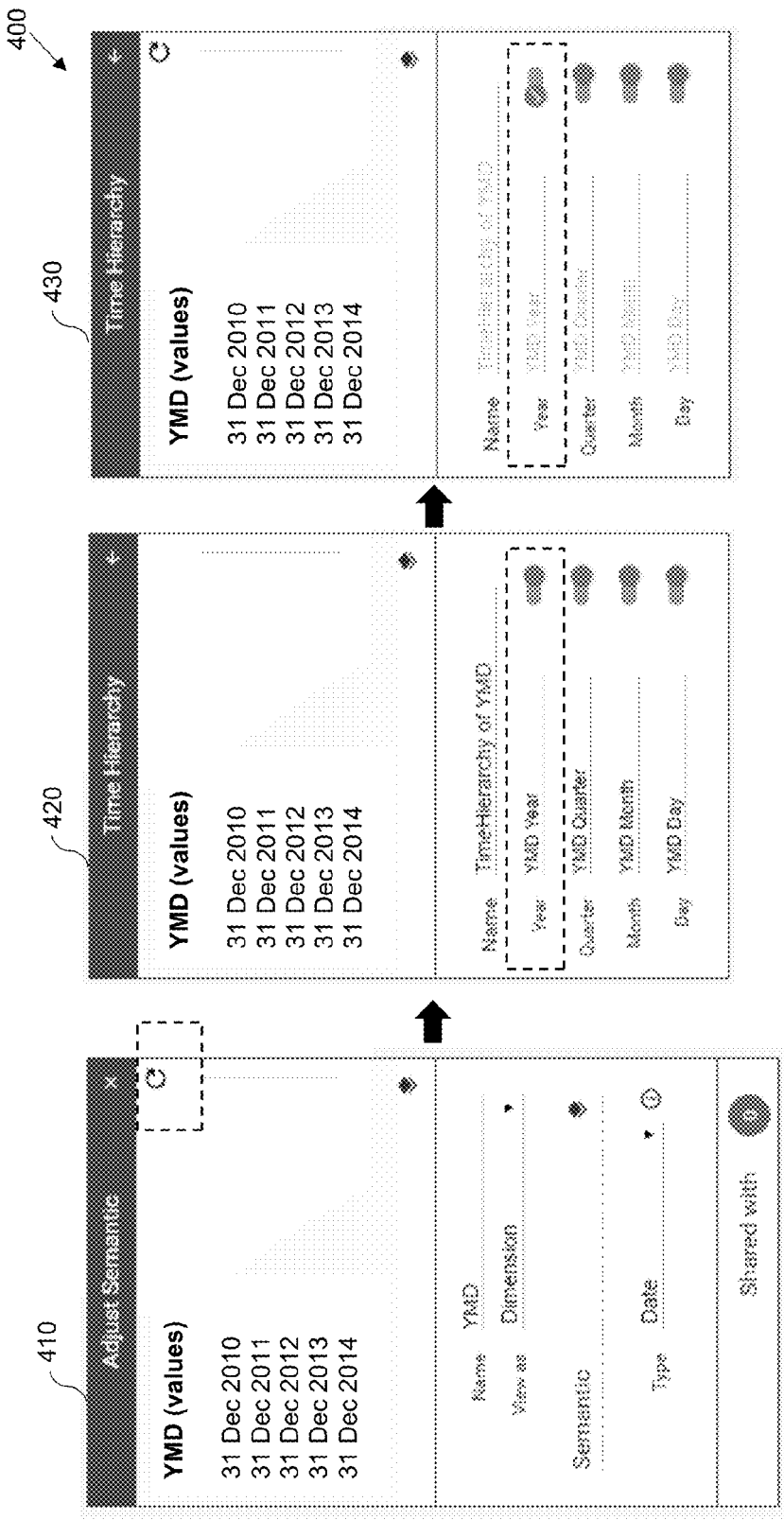
FIG. 4 is a diagram illustrating a process of modifying a time hierarchy value of an attribute in accordance with an example embodiment.

FIG. 4 illustrates a process 400 of modifying a time hierarchy value of an attribute in accordance with an example embodiment. Referring to FIG. 4, a time attribute in the format of year/month/day (YMD) from the master data is shown on user interface 410. The YMD values represent a date extracted from the master data of the data file. In addition, the user interface also displays adjustable metadata values for Name, View as, and Type. In this example, a user selects the YMD (values) tile on the screen 410 by selecting a graphic at a top right corner of the YMD tile on the user interface 410 causing the application to generate and display user interface screen 420. In other words, the user selects the attribute itself. Here, a user has the ability to adjust a time unit value (i.e., metadata value) of the attribute via user interface 420. For example, the user may adjust a value of the time unit such that the time attribute is computed Yearly, Quarterly, Monthly, or Daily. Specifically, the user may move or slide an arrow on user interface 420 at a corresponding position of a unit of time to select that unit of time. In user interface 420, the user selects the Year time unit by sliding the button to the left causing the application to generate user interface screen 430 confirming setting of the time unit to yearly with a checkmark.

Figure 5:
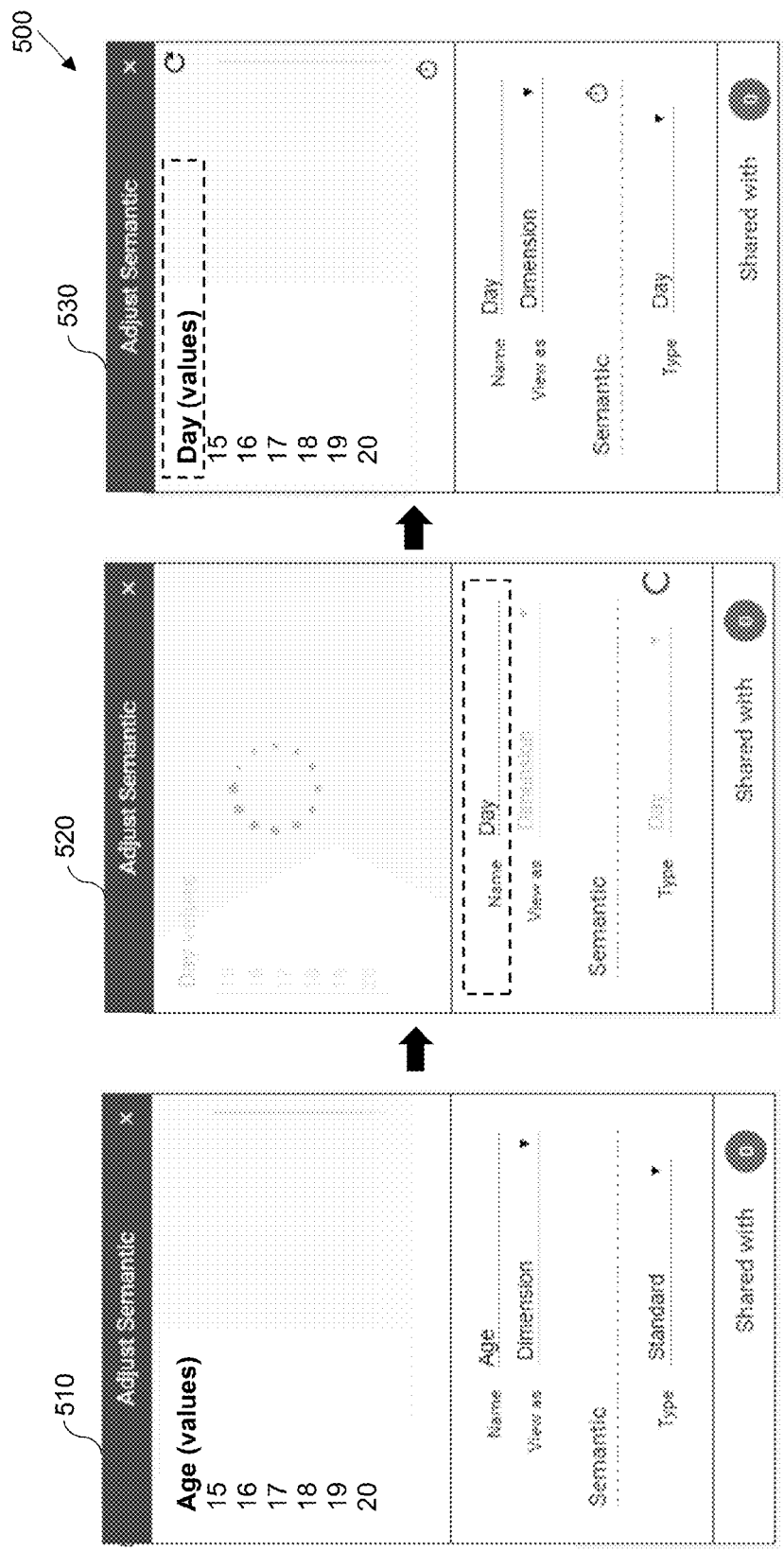
FIG. 5 is a diagram illustrating a process of modifying a semantic value of an attribute in accordance with an example embodiment.

FIG. 5 is a diagram illustrating a process 400 of modifying a semantic value of an attribute in accordance with an example embodiment. In the example of FIG. 5, a user interface screen 510 illustrates a visual preview of an age attribute having a plurality of values of master data including ages 15-20. In addition, a plurality of metadata values for Name of the attribute, View as, and Type are also listed. In this example, a user adjusts a name of the attribute and changes it from Age to Day. In particular, the user selects the Name metadata value via user interface 510, enters the text "Day" into the Name metadata value, and submits the selection causing the application to generate user interface 530 in which the attribute tile has changed from Age to Day.

Figure 6:
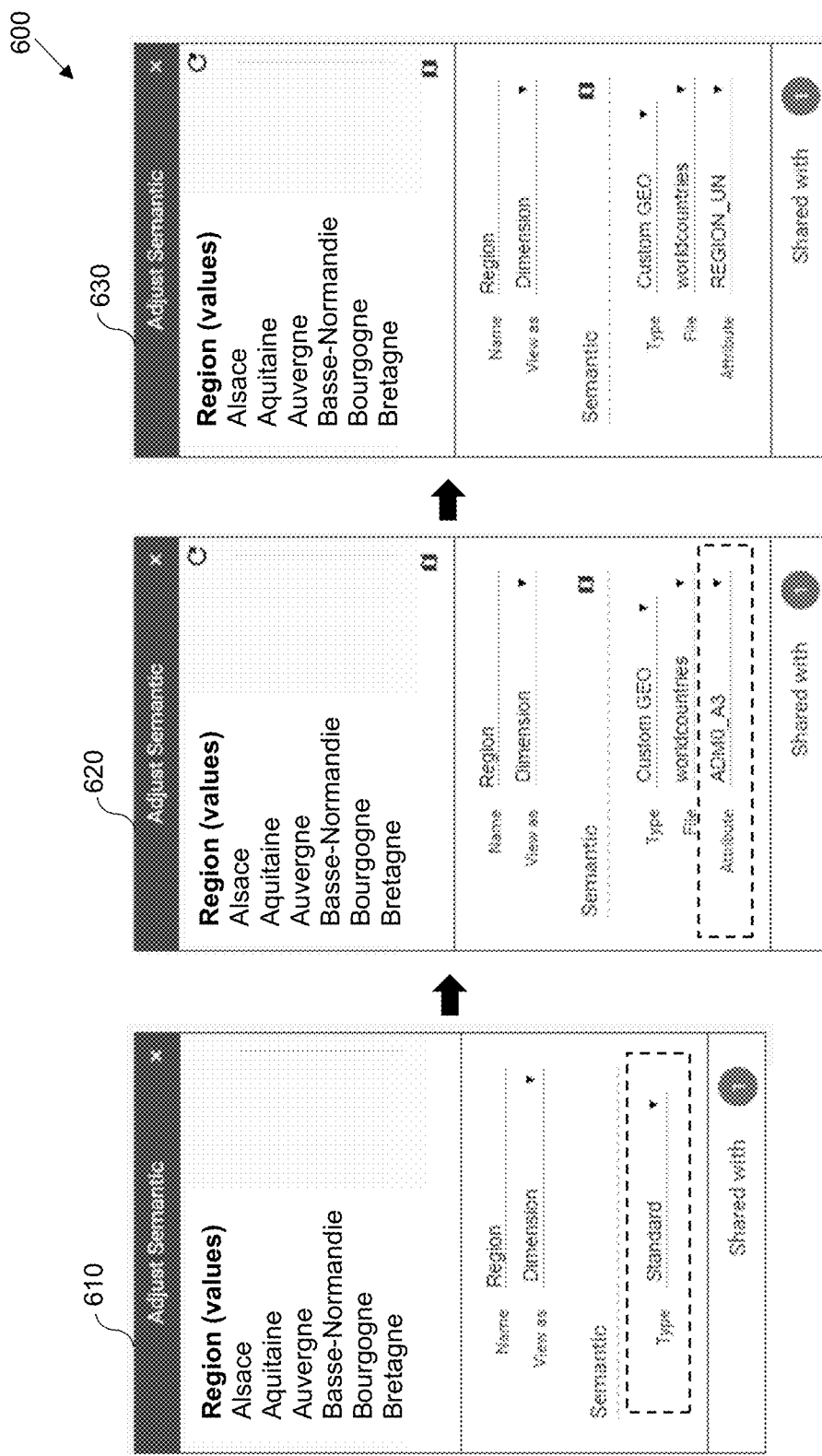
FIG. 6 is a diagram illustrating a process of modifying a geographic value of an attribute in accordance with an example embodiment.

FIG. 6 illustrates a process 600 of modifying a geographic value of an attribute in accordance with an example embodiment. Referring to FIG. 6, in user interface 610, geographic regions of master data are shown as a visual preview including a listing of the geographic regions in alphabetical order. In the process 600, a user changes a semantic value of the geographic regions from standard to custom geographic regions based on adjustable metadata values displayed below the listing of geographic regions in the visual preview of interface 610. The system can be enriched with additional geographical metadata via the industry standard format of GeoJSON and other types of formats. For example, data properties inside the GeoJSON file can be coordinates, area codes, names, and the like. Data from inside a table containing geographical information can be mapped to a certain property defined inside a certain GeoJSON file. In this example, an attribute called "Region" can have its semantic changed to Custom GEO, in 610, if GeoJSON files exist in the system (several files can co-exist inside the system, all containing geographic data properties). The system will then propose a list of available GEOJSON files, in 620. Once the user chooses one, the system will then propose a list of available geo data properties available inside the file. Once the user selects a property the semantic changes to be Geographical. In this example, as a result of the selection, instead of showing standard data charts or tables, the system will provide geographical maps using the custom geographic data.

Figure 7:
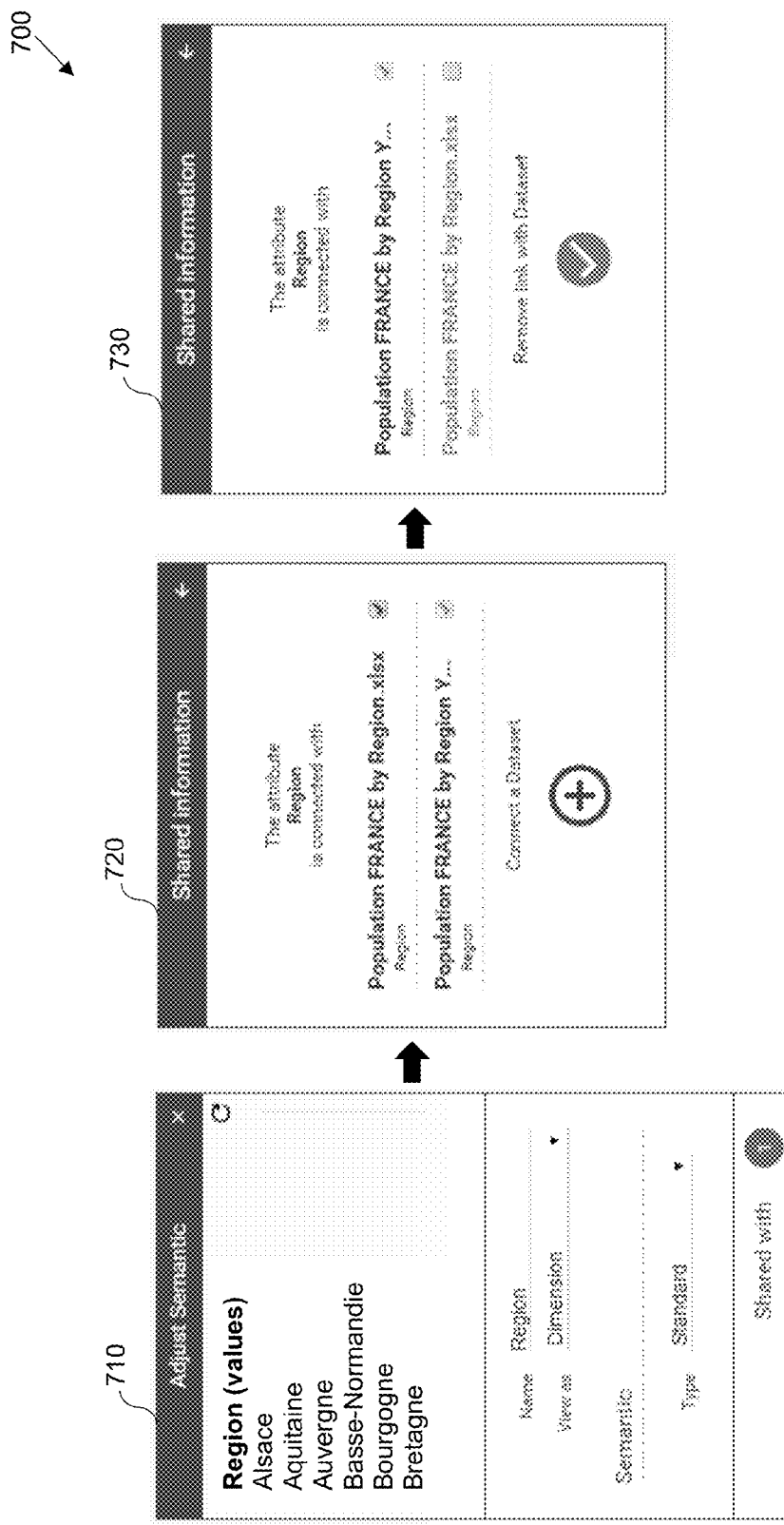
FIG. 7 is a diagram illustrating a process of unlinking shared data in accordance with an example embodiment.

FIG. 7 illustrates a process 700 of unlinking shared data in accordance with an example embodiment. As shown in user interface 710, a geographic region attribute of a first data set is shared with another data set as indicated by the number 1 at the bottom of the user interface screen 710. The user may select the "Shared with" feature via the user interface 710 causing the user interface to generate and display user interface 720 which further expands on the shared data by describing which the name of the data set that the geographic attribute is shared with. Here, a user may unlink the data set which is sharing the geographic attribute by selecting a check box causing user interface screen 730 to be generated confirming the unlinking selection.

Figure 8:
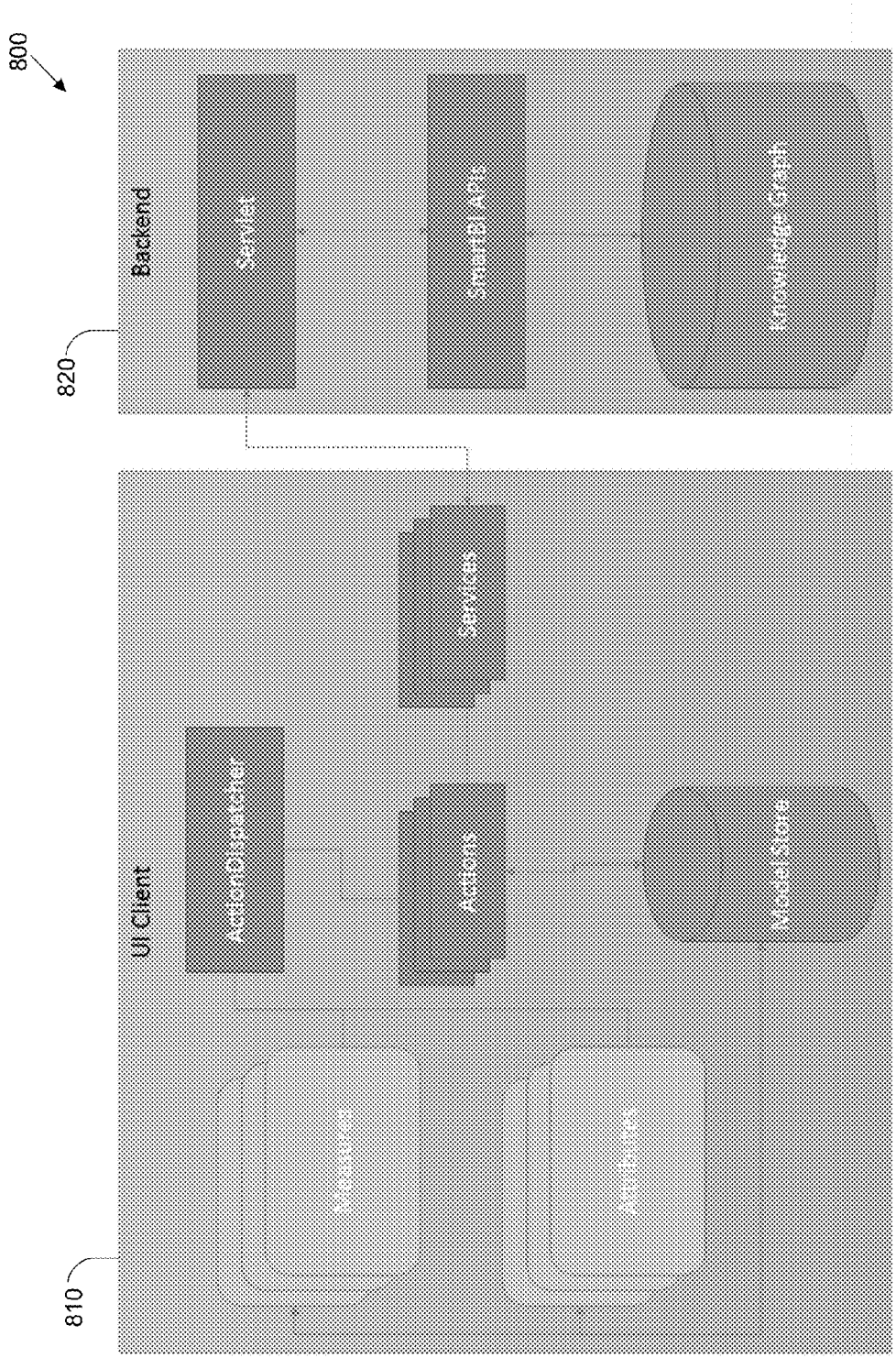
FIG. 8 is a diagram illustrating a system for generating a visual preview of master data based on metadata in accordance with an example embodiment.

FIG. 8 illustrates a system 800 for generating a visual preview of master data based on metadata in accordance with an example embodiment. Referring to FIG. 8, the system 800 includes a user device (UI client 810) and at least one server (backend 820). For example, the UI client 810 may be a computing device such a computer, a mobile device, a tablet, a smart wearable device, a notepad, an appliance, and the like. The backend 820 may be a cloud platform, one or more servers, and the like. The UI client 810 may include a Hypertext Markup Language (HTML) and JavaScript interface that uses an internal framework such as Flapjack. Each UI client 810 component can register to and then listen to a specific path in a central application model store of the UI client 810. If the data in a given path changes, the UI client 810 component updates therefore allowing either specific or global UI component updates. The backend 820 may be written in Java and may use a knowledge graph for storing the metadata of master data related objects (such as measures and attributes), and any related vertex and edges. The master data may be stored in a central database.

Each visual representation, for example, a measure object or an attribute, of the meta/master data may be an isolated UI component with its own path in the central application model store. Updating an object, such as the aggregation type of a measure, fires an event and a Dispatcher maps the event to a corresponding Action. The Action calls its corresponding Service that sends an independent call (e.g., an AJAX call) to the backend 820 for updating the knowledge graph accordingly. Once complete, the Service delegates the returned JSON result to the Action of the UI client 810 for processing and updating the corresponding path in the model with new data. UI components in the UI client 810 listening to the path may read the new data and update accordingly. As a result, the user sees instant visual feedback throughout this process and the master data preview updates accordingly.

The following illustrates an example of actions taken by the UI client 810 and the backend 820 in the system 800.

1) A first measure UI component instantly fires an Update event including data containing the update information (i.e. objectID, objectType, metadata to change, the new data etc.), and begins showing some visual feedback.
2) The ActionDispatcher maps the event to the UpdateAction.
3) UpdateAction calls the update( )method in the UpdateGraphService.
4) The update( )method sends an AJAX REST call to the backend.
5) The backend intercepts the call, reads the given data, performs the necessary updates to the Knowledge Graph and returns the result (either success or failure).
6) The UpdateGraphService calls the callback in UpdateAction.
7) UpdateAction processes the result: If success, the new data is written to the correct path in the central application model store e.g. var sPath='/objects/'+oObject._id'; oStore-.setData(sPath, oNewData); If error, UpdateAction sends a failure status to the Measure 1 UI component with the error message, which is then visually displayed near the aggregation type UI area.
8) If successful, Measure1 detects the change to its path: It updates and terminates any visual feedback. The master data preview is updated with new data.

Figure 9:
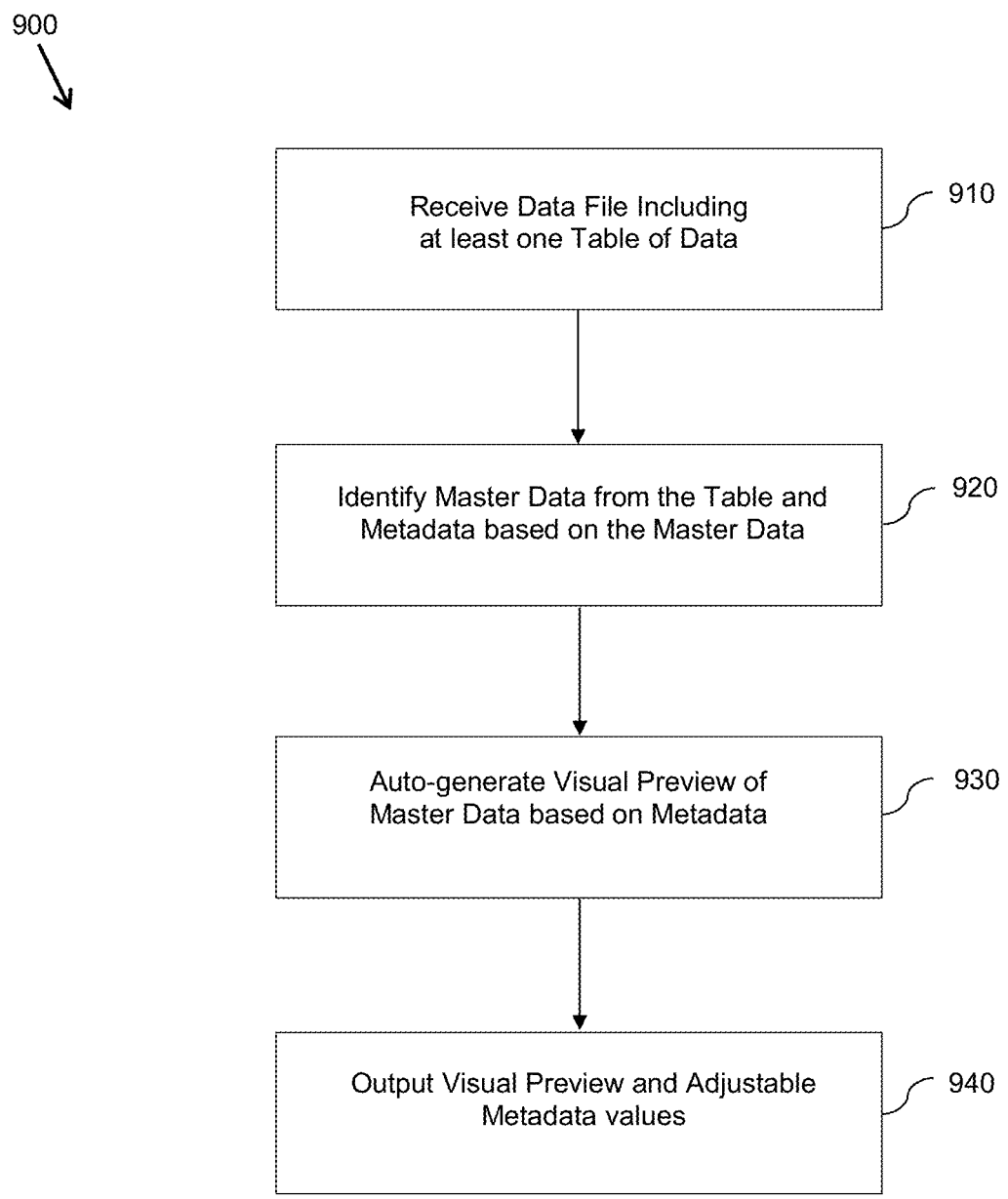
FIG. 9 is a diagram illustrating a method of generating a visual preview of master data based on metadata, in accordance with an example embodiment.

FIG. 9 illustrates a method 900 for generating a visual preview of master data based on metadata, in accordance with an example embodiment. For example, the method 900 shown in FIG. 9 may be performed by a user device, a server, a combination thereof, or another type of device or group of devices. Referring to FIG. 9, in 910 the method includes receiving a data file comprising at least one table. For example, the data file may be a spreadsheet file (e.g., excel file, .csv file, and the like), a document (e.g., word processor, notepad, and the like), a table, and the like. The file may be received by the device in response to a user dragging an icon corresponding to the file on a user interface and dropping the icon at a predetermined area on the user interface. In response to the drag-and-drop operation, the computing device may import master data from the file such as from one or more tables of data included in the file. In this example, the table data may include one or more columns and one or more rows of data having values included therein such as alphanumeric characters, words, phrases, and the like.

In 920, the method further includes identifying master data included in the data file and identifying metadata of the master data. For example, master data may be identified and extracted from a table included in the data file based on one or more of an identified column or row. The metadata associated with the master data may include other data that describes the master data, data that is capable of additionally or differently defining or describing the master data, data from the master data that can be used to group, combine, limit, narrow, and the like, the master data, etc. In 930, the method includes auto-generating a visual preview of the master data based on the metadata of the measure. For example, a visual preview of at least one of a measure and an attribute of the master data may be generated based on metadata associated therewith. In 940, the method further includes outputting the visual preview of the master data and metadata values that are associated with the visual preview and which are capable of being changed by a user via a user interface. For example, the auto-generated visual preview may include a visual preview of a measure, an attribute, and the like, of the master data. Also, the visual preview may include one or more fields, forms, options, selections, and the like, which represent values of metadata associated with the master data of the visual preview. The metadata values may include values associated with a measure, an attribute, a dimension, and the like, of the master data that may be changed by a user input via the user interface. For example, if the measure is of a total number of vehicles sold during a predetermined time, the metadata may include limiting the measure to a type of particular vehicle, a year of manufacture, a color, and the like.

In addition to generating an initial visual preview of the master data based on metadata associated with the master data, the method may further include receiving a change to a metadata value of the master data via the user interface, and modifying the initial visual preview of the master data based on the received change to the metadata value. The modifying may change the visual preview thereby displaying a measure or attribute of the master data in a different manner, for example, according to an adjusted metadata value such as a changed dimension or parameter. As a non-limiting example, the parameter that is changed may be an aggregation parameter which may be adjusted to semi-additive as shown in the example of FIG. 3. In some examples, the visual preview is stored as an object in knowledge graph stored by a database. The knowledge graph may include a component for each visual preview and the visual preview may have its own unique path. The knowledge graph may also include information about the master data (e.g., measures, attributes, etc.) associated with the visual preview and information about metadata associated with the master data of the visual preview. According to various embodiments, when the visual preview is modified via the user interface, an update may be transmitted to the database storing the knowledge graph such that the knowledge graph can update the metadata of the component associated with the visual preview. Furthermore, other objects/components may listen to the unique path and detect the update to the knowledge graph thereby enabling a global update. In addition to modifying the visual preview, the visual preview may be auto-undone (e.g., instantly), for example, by a click of a mouse, selection of a input on a touch screen, input on a keyboard, the like. The undoing of the modification to the visual preview may change the metadata value back to its initial value to generate the initially auto-generated visual preview of the master data.

Figure 10:
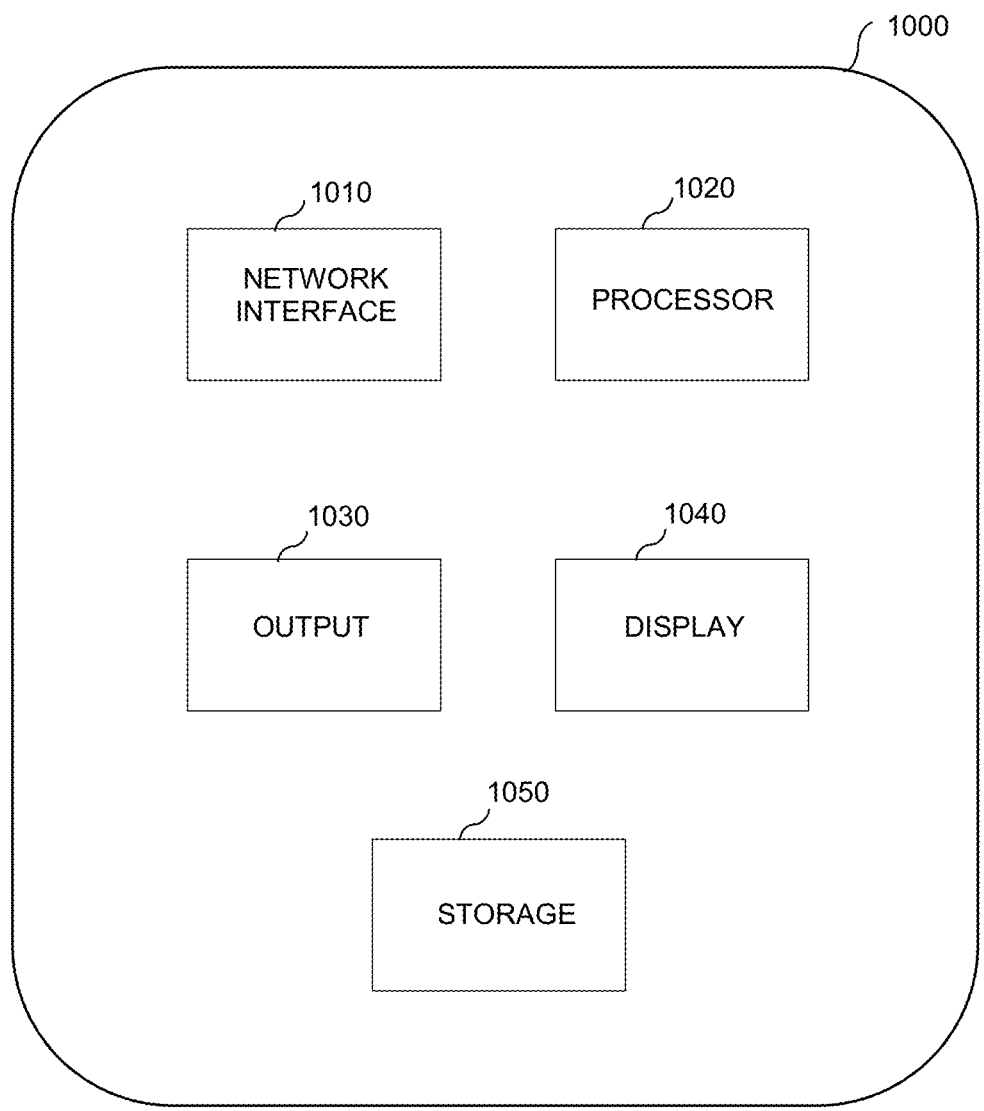
FIG. 10 is a diagram illustrating a computing device for generating a visual preview of master data based on metadata, in accordance with an example embodiment.

FIG. 10 illustrates a computing device 1000 for generating a visual preview of master data based on metadata, in accordance with an example embodiment. For example, the computing device 1000 may be a user device such as a laptop, tablet, desktop computer, mobile device, appliance, kiosk, notepad, and the like. As another example, the computing device 1000 may be a back-end server or cloud architecture connected to a user device. Also, the computing device 1000 may perform the method 900 shown in FIG. 9. Referring to FIG. 10, the computing device 1000 includes a network interface 1010, a processor 1020, an output 1030, a display device 1040, and a storage device 1050. It should also be appreciated that the computing device 1000 may include other features not shown in FIG. 10 or some of the features shown in FIG. 10 may be combined. The network interface 1010 may transmit and receive data to and from other devices over a network such as the Internet, a private network, and the like. The processor 1020 may control the overall operations of the features of the computing device 1000 and may include one or more processing devices each having one or more processing cores. The output 1030 may output data to a display screen such as a display screen of an externally connected device, or to the local display 1040. The output data may have a format such as the examples described and illustrated with respect to FIGS. 1A-7, or it may have another type of format.

The storage 1050 may store one or more data files including master data, and metadata associated with the master data. In some examples, the storage 1050 stores and updates a knowledge graph associated with the displayed data. The processor 1020 may identify master data included in the at least one table of the data file and identify metadata of the master data. Furthermore, the processor 1020 may auto-generate a visual preview of the master data based on metadata of the master data. In response, the output 1030 may output, to a user interface, the visual preview of the master data and metadata values that are associated with the visual preview and which are capable of being changed via the user interface. The visual preview may include a preview of a measure of the master data, an attribute of the master data, metadata associated with the measure or the attribute, and the like. For example, the visual preview may include a graph, a chart, a numerical value, alphanumeric descriptions, and the like.

According to various embodiments, the processor 1020 may detect a change to a metadata value such as the metadata value being adjusted by a user via the user interface, and modify the visual preview of the master data based on the received change to the metadata value of the master data. In this case, a measure of the master data may be displayed by the visual preview. The measure may include a numerical value and one or more charts and graphs based thereon. In addition to the measure, the visual preview may include a line, field, text, box, selection, or the like, enabling a user to adjust one or more metadata values associated with the visual preview of the measure via the user interface. In response to receiving an input of the user adjusting one of the metadata values, the processor 1020 may change the visual preview of the measure of the master data to reflect the change of the metadata value associated therewith without requiring an IT administrator to make such change. In some examples, the visual preview may display a plurality of attributes of the master data along with adjustable metadata values associated with the plurality of attributes. In this example, the user may adjust metadata values associated with a measure or an attribute and the change may be reflected by modifying the visual preview.

The processor 1020 may transmit an update to a knowledge graph or other model stored in the storage 1050. Here, the knowledge graph may include a component for each measure and attribute along with metadata associated therewith. The update may indicate a component of the knowledge graph that needs to be updated along with a change to a metadata value associated with the measure or attribute. Furthermore, because the visual preview is auto-generated the visual preview may be immediately undone by another input via the user interface. In response the processor 1020 may undo the modifying of the visual preview of the measure based on the change to the metadata value to the initially auto-generated visual preview of the measure, or change the visual preview to another auto-generated visual preview.

According to various example embodiments, described herein is a system and method for generating a visual preview of master data. The visual preview further includes one or more metadata values that are associated with the visual preview of the master data and that are capable of being adjusted by a simple user selection, or other operation thereby causing the visual preview to be modified accordingly. As a result, a user can easily modify a visual preview of master data by adjusting metadata values without the need to contact an IT person or an administrator. Furthermore, the visual preview can be modified immediately based on the user selection thereby enabling a user to make an instant validation on the change or undo the change just as quickly.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, semiconductor memory such as read-only memory (ROM), and/or any transmitting/receiving medium such as the Internet, cloud storage, the internet of things, or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing device for generating and outputting a visual preview of data, the computing device comprising:
a storage configured to store a data file comprising at least one table;
a processor configured to identify master data included in the at least one table of the data file and identify metadata of the master data, auto-generate a visual preview of a measure of the master data based on metadata of the measure, and associate the visual preview with a path of the metadata in a model store; and
an output configured to output, to a user interface, the visual preview of the measure and metadata values that are associated with the visual preview of the measure and which are capable of being changed via the user interface,
wherein, in response to receiving a change to a metadata value of the measure, the processor is configured to update the metadata value at the path in the model store based on the received change in the metadata value which triggers a corresponding update in the output of the visual preview that is listening to the path.

2. The computing device of claim 1, wherein the processor is further configured to transmit an update to a knowledge graph storing a component of the measure and the metadata associated therewith based on the received change, wherein the update identifies the change to the metadata value of the measure.

3. The computing device of claim 1, wherein the received change to the metadata value comprises a change of an aggregation value of the measure to semi-additive, and the processor is configured to modify the visual preview of the measure based on the semi-additive aggregation value.

4. The computing device of claim 1, wherein the processor is further configured to undo the modifying of the visual preview of the measure based on the change to the metadata value to the initially auto-generated visual preview of the measure, in response to detecting an undo command via the user interface.

5. The computing device of claim 1, wherein the processor is further configured to auto-generate a visual preview of a plurality of attributes of the master data based on metadata associated with the plurality of attributes, and the output is further configured to output, to the user interface, the visual preview of the plurality of attributes and respective metadata values of the plurality of attributes that are associated with the visual preview and which are capable of being changed via the user interface.

6. The computing device of claim 1, wherein the stored file comprises a spreadsheet file, and the processor is further configured to import data from at least one table included in the spreadsheet file.

7. The computing device of claim 1, wherein the metadata values comprise one or more dimensions of the measure, and the one or more dimensions are capable of being changed via the user interface.

8. The computing device of claim 1, wherein the processor updating the metadata value at the path in the model store based on the change further triggers a corresponding update to another visual preview that is also listening to the path.

9. A method for previewing data, the method comprising:
receiving a data file comprising at least one table;
identifying master data included in the at least one table of the data file and identifying metadata of the master data;
auto-generating a visual preview of a measure of the master data based on metadata of the measure of the master data and associating the visual preview with a path of the metadata in a model store;
outputting, to a user interface, the visual preview of the measure and metadata values that are associated with the visual preview of the measure and which are capable of being changed via the user interface; and
in response to receiving a change to a metadata value of the measure, updating the metadata value at the path in the model store based on the received change in the metadata value which triggers a corresponding update in the output of the visual preview that is listening to the path.

10. The method of claim 9, wherein the modifying the visual preview further comprises transmitting an update to a knowledge graph storing a component of the measure and the metadata associated therewith based on the received change, wherein the update identifies the change to the metadata value of the measure.

11. The method of claim 9, wherein the received change to the metadata value comprises a change to an aggregation value of the measure to semi-additive, and the modifying comprises modifying the visual preview of the measure based on the semi-additive aggregation value.

12. The method of claim 9, further comprising undoing the modifying of the visual preview of the measure based on the change to the metadata value to the initially auto-generated visual preview of the measure, in response to receiving an undo command via the user interface.

13. The method of claim 9, wherein the auto-generating the visual preview further comprises auto-generating a visual preview of a plurality of attributes of the master data based on metadata associated with the plurality of attributes, and the outputting further comprises outputting, to the user interface, the visual preview of the plurality of attributes and respective metadata values of the plurality of attributes that are associated with the visual preview and which are capable of being changed via the user interface.

14. The method of claim 9, wherein the received file comprises a spreadsheet file, and the method further comprises importing data from at least one table included in the spreadsheet file.

15. The method of claim 9, wherein the metadata values comprise one or more dimensions of the measure and the one or more dimensions are capable of being changed via the user interface.

16. A method for previewing data, the method comprising:
receiving a data file comprising at least one table;
identifying master data included in the at least one table and also identifying metadata associated with the master data;

auto-generating a visual preview of a plurality of attributes of the master data based on metadata associated with the plurality of attributes of the master data and associating the visual preview with a path of the metadata in a model store;

outputting, to a user interface, the visual preview of the plurality of attributes and respective metadata values that are associated with the visual preview of each respective attribute and which are capable of being changed via the user interface; and in response to receiving a change to a metadata value of an attribute, updating the metadata value at the path in the model store based on the received change in the metadata value which triggers a corresponding update in the output of the visual preview that is listening to the path.

17. The method of claim 16, wherein the auto-generating the visual preview further comprises auto-generating a visual preview of a measure of the master data based on metadata associated with the measure, and the outputting further comprises outputting, to the user interface, the visual preview of the measure and metadata values of the measure that are associated with the visual preview and which are capable of being changed via the user interface.

18. The method of claim 16, wherein the modifying the visual preview further comprises transmitting an update to a knowledge graph storing a component of the attribute and the metadata associated therewith, wherein the update identifies the change to the metadata value of the attribute.

* * * * *